Figure 1:
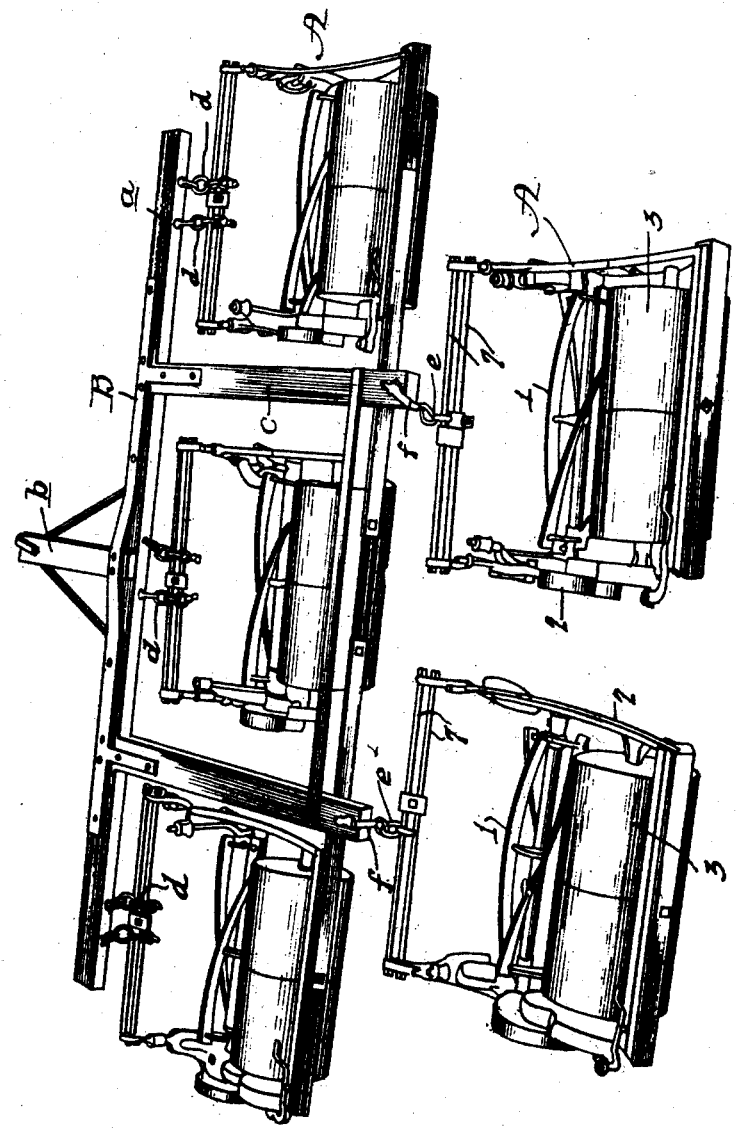

Nov. 17, 1925.　　　　　　　　　　　　　　　　1,561,569
J. A. ROSEMAN
POWER MOWER
Filed April 15, 1922　　　　5 Sheets-Sheet 1

Inventor,
Joseph A. Roseman,
By Offield Towle Linthicum & Scott
Attys

Nov. 17, 1925.                                                  1,561,569
                        J. A. ROSEMAN
                        POWER MOWER
                    Filed April 15, 1922          5 Sheets-Sheet 2
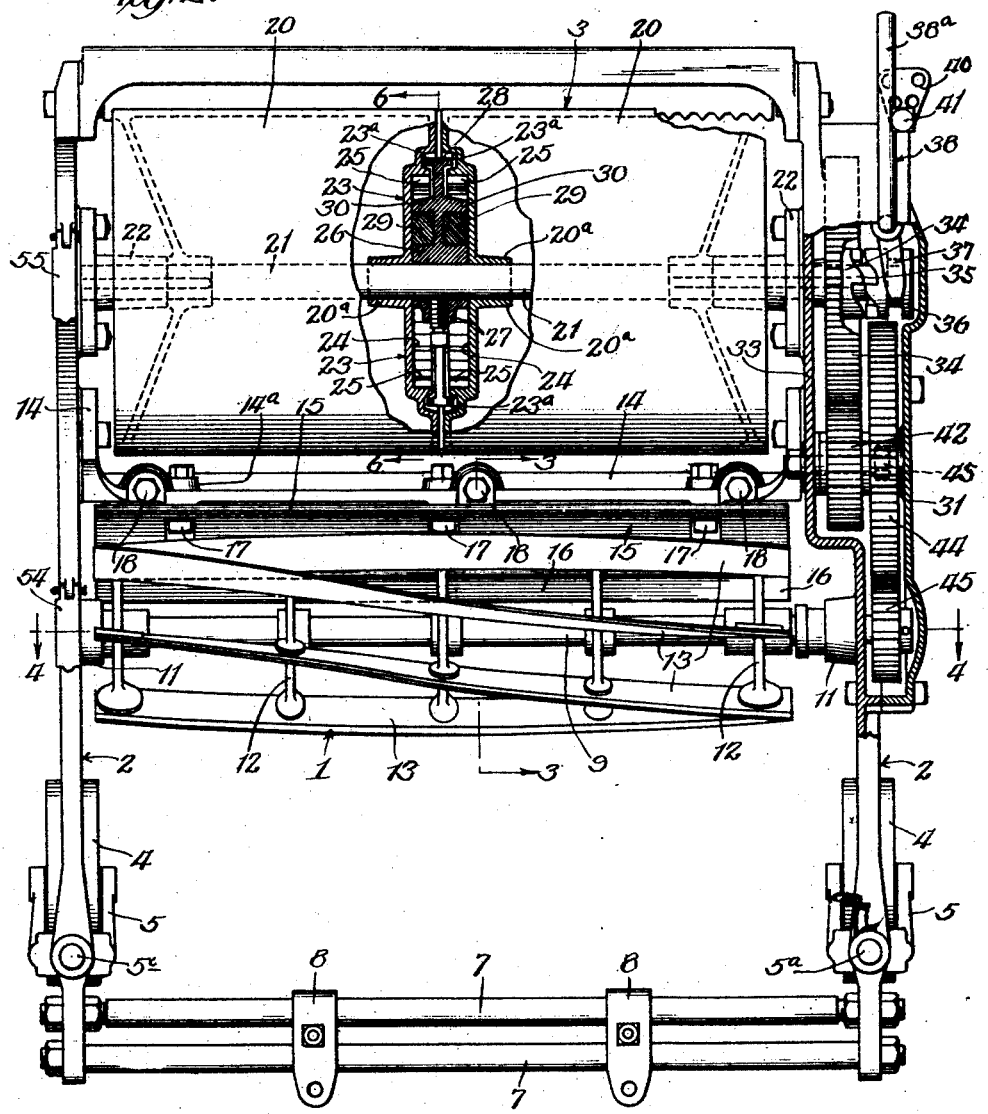

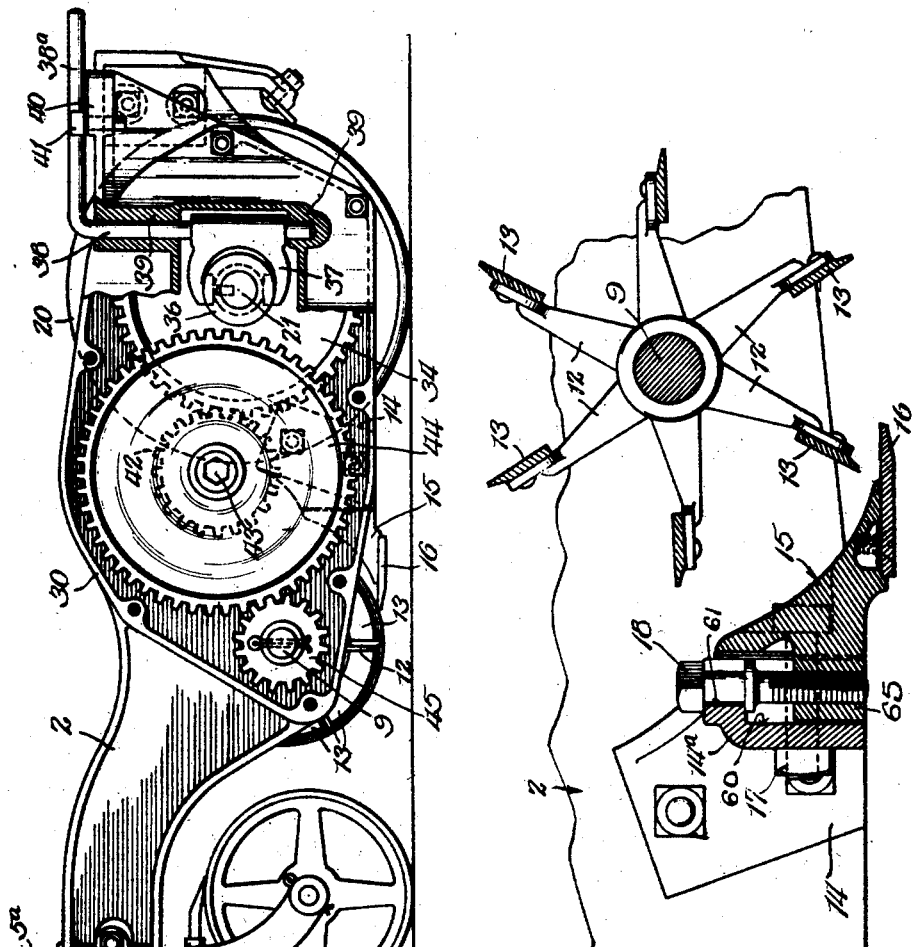

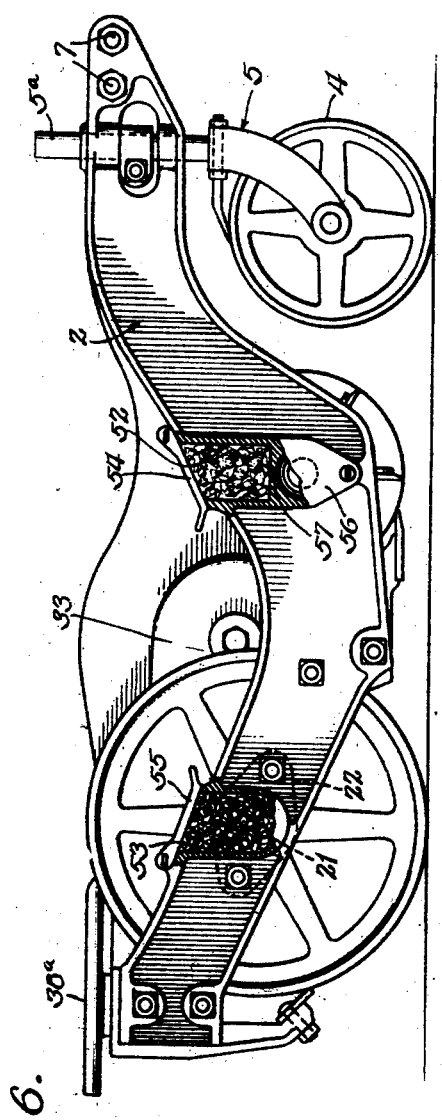
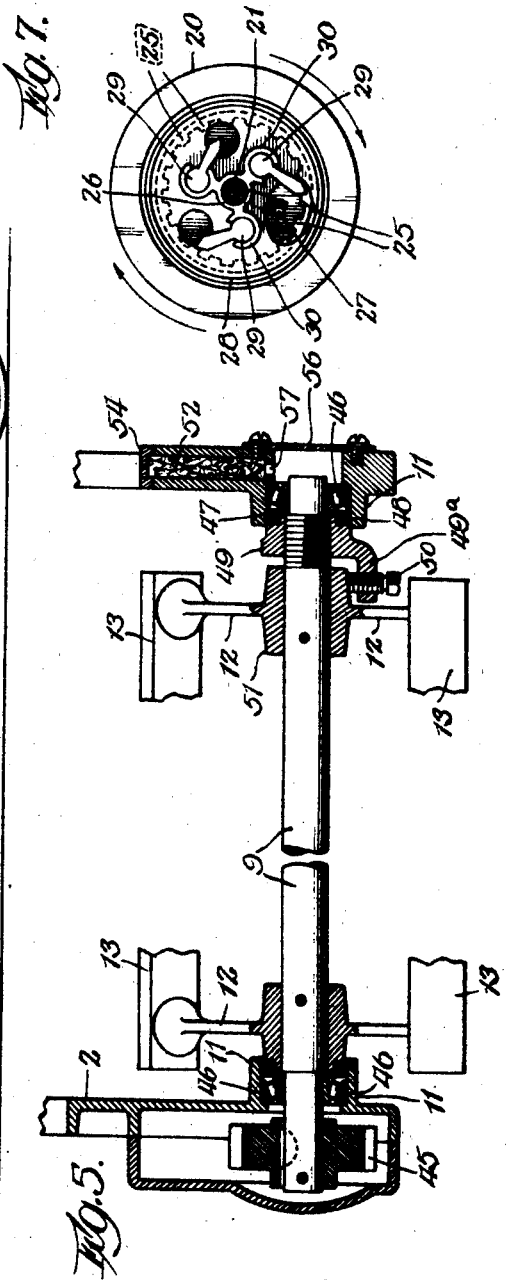

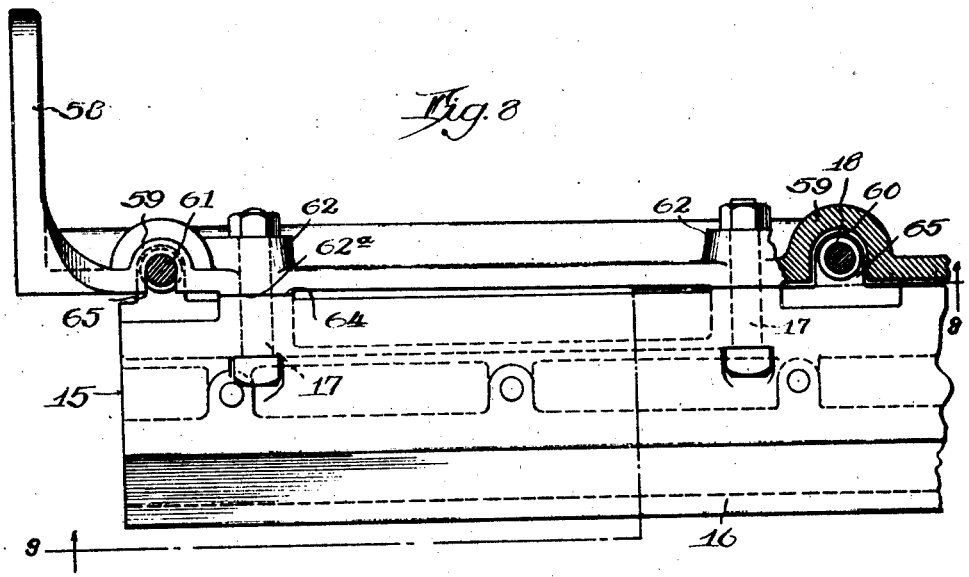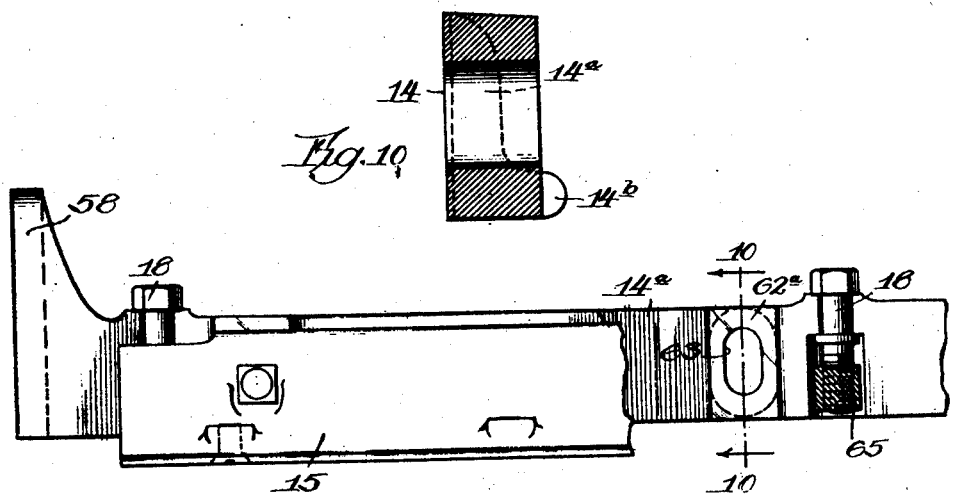

Patented Nov. 17, 1925.

1,561,569

UNITED STATES PATENT OFFICE.

JOSEPH A. ROSEMAN, OF EVANSTON, ILLINOIS.

POWER MOWER.

Application filed April 15, 1922. Serial No. 553,175.

*To all whom it may concern:*

Be it known that I, JOSEPH A. ROSEMAN, a citizen of the United States, and a resident of Evanston, in the county of Cook and State of Illinois, have invented certain new and useful Improvements in Power Mowers, of which the following is a specification.

This invention relates to improvements in power mowers and more particularly to a new and novel construction for a mowing unit ordinarily constituting one element of a tractor-drawn gang mower.

The object of the invention is to provide certain improved features of mechanical construction whereby more perfect and dependable operation is secured and promoting greater durability and a greater degree of mechanical perfection than has heretofore been obtained in mowing devices of the particular character to which this invention relates.

The mower, of which the structure herein disclosed forms one of the mowing units, is of the type ordinarily employed in the cutting of grass on large areas, such as golf courses, the several units being hitched together in such a way as to form a combination of articulated mower units arranged transversely of the path of the mower, as is customary in all gang implements.

The several improved features will be hereinafter referred to in detail in the description which follows, reference being had to the accompanying drawings, in which:

Figure 1 is a perspective view of a complete mower, showing the gang arrangement of the mower units, Figure 2 is a top plan view of a mower unit with portions broken away to show more clearly the internal construction, Figure 3 is a view in side elevation of the gear side of the unit with the gear case cover removed, Figure 4 is an enlarged detail view in cross-section through the cutting elements, as taken on line 3—3 of Figure 2, Figure 5 is an enlarged detail view in vertical section as taken on line 4—4 of Figure 2, Figure 6 is a view in elevation of the right or bearing side of the unit, Figure 7 is a detail view of the roller differential as taken on line 6—6 of Figure 2, Figure 8 is an enlarged top plan view of a portion of the cross-bar and bed knife shoe, Figure 9 is an enlarged front view of the cross-bar and bed knife shoe, and Figure 10 is a cross-sectional view of the cross-bar, taken on line 10—10 of Figure 9.

A mower such as the present invention contemplates, is preferably a tractor drawn apparatus made up of a plurality of separated mower units A—A (Fig. 1) hitched to a frame B, in a predetermined formation, ordinarily termed a "gang". The frame consists of a transverse main bar $a$ having a forwardly projecting pole $b$ located intermediate its ends, whereby attachment to the rear of a tractor is made. Along this bar are hitched three of the units with spaces therebetween at points intermediate the forwardly line of mower units are rearwardly extending bars $c$—$c$, to which are attached two other mower units forming a second line, each of the rear mower units being located in alignment with the spaces between the mower units of the front line, in that all of the ground traversed by the mower is cut over uniformly. The forward line of mowing units A are preferably attached to the transverse bar $a$ by pairs of short chains $d$—$d$, whereas the rearmost units are connected by a short chain $e$ and clevises $f$ to the ends of the bars $c$—$c$. Thus the units are free to travel independently of each other and to follow the undulations of the ground traversed.

In general, each mower unit comprises a low carriage adapted to be drawn along the ground, and consisting of a rotary cutting element 1 similar to the cutter of the ordinary hand lawn mower, longitudinal side frame members 2—2 supporting the ends of the cutting element, a heavy roller 3 located immediately behind the cutting element, and adapted to support the rear portion of the carriage upon the ground, and a pair of caster-like wheels 4—4 journalled at the forward end of each side frame member 2. These wheels 4—4 are journalled in freely swinging yokes 5—5 terminating at their upper ends in vertical spindles $5^a$, journalled in suitable bearings formed in side frame members and are capable of turning freely as well as adjustable vertically, so that said wheels follow in the path along which the unit is drawn, and as such, act to support and control the height of the forward end of the mower. Inasmuch as these so-called caster wheels perform a well known function, they will not be again referred to.

The side frame members 2, 2 extend throughout the length of the unit and are arranged in parallel relation, being connected at their forward ends by a pair of tie rods 7, 7 to which are attached adjustable clevises 8, 8 whereby the unit is coupled to the main portion of the mower.

The cutting element 1 comprises a central shaft 9 journalled at its ends in anti-friction bearings 10, preferably of the roller type, said bearings being mounted within bearing sleeves 11 integral with the inner face of the side frame members 2, 2. Keyed to the shaft is a series of spiders 12 which carry at their outer ends the cutting blades 13 of slightly helical contour, as is customary in cutting elements of this type.

Extending transversely between the side frame members and immediately to the rear of the cutting element is a cross-bar 14, which in turn carries a shoe 15 extending downwardly and projecting forwardly beneath the path of the rotary cutting element, and supporting on its under side a bed knife 16. The edge of the bed knife lies in the path of the cutting edges of the blades 13 and it is the cutting action between these several blades and knife 16 which severs the grass as the mower is advanced. The shoe 15 is mounted upon the cross bar 14 by means of a series of horizontal bolts 17 passing through the shoe and a vertically disposed flange 14ª. (Fig. 3) of said cross bar. These bolts 17 are located at three points along the cross bar, namely, a short distance inwardly from the ends thereof, and midway therebetween. Adjacent to each of the horizontal bolts 17 is located a vertical adjustment screw 18 pivotally mounted or journalled in the cross bar 14 and anchored at its lower end in the shoe 15 (Fig. 3). By providing a cross bar and a separate and adjustable knife holding shoe 15 connected at three points along said cross bar together with vertical adjustment at the several points of connection, a more perfect alinement between the bed knife 16 and the blades of the rotary cutter may be more accurately obtained, and such alinement less liable to be disturbed from the effects of hard usage to which the cutting elements are subjected. Stability and permanence of alinement is especially essential in an implement of this character where obstructions such as stones and twigs are frequently encountered in the cutting operation, and particularly where no effort is made to remove such obstructions, owing to the manner in which the implements are operated and the large areas to be cut.

The roller 3 heretofore referred to as mounted at the rear of the unit and immediately behind the rotary cutter 1, preferably consists of two cylindric sections each constituting one half of the roller. These sections or halves 20, 20 of the roller are fixed to a central shaft or axle 21 journalled in bearings 22 and bolted to the inner face of the side frame members 2, 2. One end of the shaft 21 projects through the right hand frame member 2 terminating in a gear casing and carrying a gear wheel and clutch members, hereinafter to be described as a part of the complete driving mechanism of the device. The opposite end of the roller axle 21 terminates in a lubricating chamber or well, also to be described more in detail in connection with other lubricating features of the device.

The roller sections 20, 20 are provided at their inner ends with opposing end walls 23, 23 spaced a short distance apart and each having a concentric central depression 24 therein, there being ratchet teeth 25 cut in the periphery of said depressions, said teeth extending completely around said peripheries in the manner of internal gear wheels. Rigidly fixed to the roller axle 21 is a ratchet pawl retainer 26 consisting of an annular disk having a hub portion surrounding the shaft 21 and occupying the space between the adjacent end bearings 20ª of the roller sections 20, and non-rotatively fixed to said shaft by means of a set screw 27. On the periphery of the retainer disk 26 is formed a flange 28 which rides within an annular space immediately surrounding the ratchet teeth 25 and formed by the provision of oppositely facing grooves 23ª, 23ª formed in the end walls 23 of the roller sections 20. The purpose of the peripheral flange 28 is to prevent dirt from entering between the roller sections and accumulating within the space occupied by the pawl and ratchet mechanism now to be described more in detail.

Carried upon opposite faces of the pawl retainer disk 26 are pairs of pawls 29, there being preferably three on each side of the disk. These pawls are journalled in bearing sockets 30 formed integral with the retainer disk and spaced apart at angles of 120°. The pawls 29 extend toward the ratchet teeth and generally at right angles to the radii passing through their axis of rotation. As clearly shown in Fig. 6, the pawls are free to swing through a limited arc, so that, assuming that the roller is rotating in a clockwise or forward direction, the lowermost pair of pawls drop into engagement with the ratchet teeth and thus connect the roller sections with the shaft 21 with the result that all parts of the roller rotate as a single unit. However, if one or the other of the roller units should travel at a greater speed, for instance, the outside roller section, where the unit is travelling along a curvilinear path, said outer section rotates freely on the axle 21 and the inner section remains connected with the shaft through the associated pawl and ratchet teeth and constitutes the driving section of the roller.

Considering now the driving mechanism, it is to be understood that the rotary cutter derives its motion from the roller 3 as it travels over the ground, or in other words, it is driven by the roller. The driving mechanism is located within an oil-tight and dust-proof gear casing located on the outside of the right hand side frame member 2, said gear casing being formed by an outwardly extending flange 30 surrounding that portion of the side frame member including the driving mechanism, and to which is bolted a cover plate 31. The side frame member 2, furthermore, has its rear portion offset inwardly as at 33, thereby affording additional depth or space for the driving gears. It is through this offset portion or wall 33 of the right hand side frame member 2 that the roller shaft 21 projects. Loosely mounted on the end portion of said shaft is a primary driving gear wheel 34. Integral with the driving gear 34 and forming a part of the hub 34ª thereof, is a clutch member consisting of a series of outwardly facing clutch teeth 35. Fixed or keyed to the end of the shaft 21 is a complementary clutch member or collar 36 provided with complementary clutch teeth adapted to engage the clutch teeth 35 carried by the gear wheel 34. The clutch member is shiftable endwise of the shaft through the medium of the shifting yoke 37 carried by a vertical clutch lever 38 journalled in suitable bearings 39 immediately to the rear of the clutch member 36, said clutch lever having a rearwardly extending horizontal handle 38ª adapted to swing above a triangular shaped plate 40 having a series of holes therein adapted to receive a stop pin 41.

The gear wheel 34 being loosely mounted on the shaft 21, is connected or disconnected therefrom through the medium of the clutch member 36, which is shifted into and out of clutching engagement by means of the clutch lever 38, the latter being held in and out of clutch engaging position by locating the stop pin 41 within the desired hole in the plate 40. Meshing with the gear wheel 34 is an intermediate pinion 42 journalled upon a stub shaft 43, said intermediate pinion 42 being integral with a large intermediate gear wheel 44, which in turn meshes with a cutter driving pinion 45 keyed to the end of the cutter shaft 9 which extends through the journal sleeve 11 into the forward end of the gear casing. The train of gearing thus shown and described, transmits power from the roller axle to the cutter shaft at increased speed which is commensurate with the gear ratios between the various gear wheels. Thus the speed of the rotary cutter bears a definite speed ratio to the rate of travel of the roller at all times. Furthermore, by reason of the clutch mechanism the cutter drive may be interrupted when desired, as for instance, in transporting the implement over rough ground or under other circumstances where no cutting action is desired. Furthermore, by virtue of the pawl and ratchet device associated with the roller 3, both sections turn freely on the axle when the unit is moved rearwardly, so that it is only possible to drive the cutter when the implement is moving forwardly.

Referring now to the means for supporting the ends of the cutter shaft 9 and lubricating the same, as hereinbefore set forth, it is preferred to employ roller bearings 46, 46 which are housed within the integral bearing collars 11, 11 as heretofore described. These bearings are preferably of the roller type, and support the ends of said shaft. The entrance to the bearing chamber is preferably sealed by means of thin washers 47 together with external felt washers 48. In addition to the roller bearings, provision is made for adjusting the shaft relative to bearings, this adjustment being confined preferably to the left end of the shaft, there being mounted just inwardly from the bearing a screw collar 49 (Fig. 5) said collar engaging a screw-threaded portion of the shaft 9 and bearing at its outer face against the washer 48. At the periphery of the collar is provided a laterally extending lug 49ª carrying a lock screw 50 adapted to bear against the hub 51 of the cutter spider 12 at the adjacent end of the shaft. Manifestly, by loosening the lock screw 50 and rotating the collar in either direction, the necessary adjustment can be made in the bearing, thus compensating for any wear, lost motion or undesired endwise movement between the shaft and bearings.

Referring to Figs. 5 and 6, the method of lubricating the cutter and roller shaft bearings on the right hand side of the carriage is clearly shown. In both instances vertically arranged oil wells 52 and 53, respectively, are formed integral with the left hand side frame member and extend downwardly from the upper edge thereof and include the bearings. These oil wells are preferably filled with waste or other absorbent material and the openings thereto closed by hinged oil covers 54 and 55. In the case of the left hand cutter shaft bearing, a cavity surrounds the end of the shaft, the same being closed by means of a removable cover plate 56 applied to the outside of the frame member. This cavity communicates with the oil well immediately above by means of a small opening 57. This arrangement provides continuous lubrication, and at the same time excludes dirt and grass from the bearings, all tending toward free and smooth running parts and decreased wear throughout the device.

A clearer understanding of the construction of the bed knife shoe 15 and cross-bar 14, can be had from Figures 8, 9 and 10, and particularly the method of knife adjustment employed. As before indicated, the cross-bar 14 is a fixed member extending transversely of the side frame members 2—2, between the rotary cutter and the roller. In general, the cross bar is L-shaped in cross-section, having a forwardly projecting flange or lip 14$^b$ along its lower edge. At each end of the bar are integral angle plates 58, which bear against the side frame members. Adjacent each end of the cross-bar and midway between the ends are pairs of bolt engaging formations whereby the bed knife shoe 15 is adjustably mounted upon the bar, the same as heretofore described, being a bar cast of malleable iron which supports the bed knife 16, and projects forwardly from the bar 14 toward and beneath the path of the rotary cutter (Figure 3). The shoe extends substantially throughout the length of the bar 14, and is provided at three points; to-wit, at each end and at its middle, with complementary parts co-acting with the parts of the bar, whereby the connections are made. The cross-bar is provided along its forward face with vertically arranged bosses 59, in which are formed open and semicylindric shaped slots 60, having a portion 61 of reduced radius at its upper end (Figure 3). Adjacent each of the vertical bosses 59 are horizontal bosses 62 having vertically elongated bolt holes 63 therein, the rear faces 62$^a$ of the bosses forming bearing surfaces adapted to engage complementary bearing faces 64 on the adjacent surface of the shoe 15. Through the bolt holes 63 and registering bolt holes extending transversely through the shoe 15, are mounted the horizontal bolts 17. There are formed integral with the shoe 15, and along the lower rear edge, lugs 65 adapted to engage within the open slot 60 in the cross-bar. These lugs are tapped vertically and receive the threaded ends of the vertical screws 18, each having a cylindric bearing portion between the head 66 and a flange 67, spaced below the head (Figure 3), which rotatively engages the reduced slotted portion 61. In this manner the screws are held from endwise movement, and by their rotation, the shoe 15 is adjusted vertically to secure the desired cutting action between the rotary cutting blades 13 and the bed knife 16. In practice it is not ordinarily necessary to loosen the horizontal bolts 17 in making adjustments, there being sufficient resiliency inherent in the metal to effect the displacement of the parts without doing so. Thus the entire blade adjustment is taken care of by the vertical screws 18, whereby the shoe slides vertically in contact with the cross-bar 14 at the several spaced bearing faces 64 and 62$^a$. The interfitting lugs 65 and slots 60 hold the parts against endwise displacement. The adjustment at three points provides a more rigid construction, and overcomes the tendency for the metal to spring out of shape, or to become set in a distorted position, as would effect the alignment of the blades and the cutting action thereof.

Having described the novel features of the device embodying the invention, I claim:

1. In a mower of the character described, the combination of a carriage comprising side frame members, a rotary cutter journalled in said side frame members, a transverse frame member extending parallel with and adjacent to said cutter, a shoe mounted on said transverse frame member, means at the ends and intermediate the ends of said shoe for adjusting the same relative to said frame member and cutter, and a knife fixed to said shoe.

2. In a mower of the character described, the combination of a carriage comprising side frame members, a rotary cutter journalled in said side frame members, a transverse frame member extending parallel and adjacent to said cutter, a shoe mounted on said transverse frame member, a knife fixed to the bottom of said shoe and adjusting members at the ends and intermediate the ends of said frame member and shoe for adjusting the latter relative to said cutter.

3. In a mower of the character described, the combination of a carriage comprising side frame members, a rotary cutter extending transversely of said side frame members, a cross bar mounted adjacent the path of said cutter blades, a shoe mounted on said cross bar and a plurality of adjusting members mounted intermediate the ends of said cross bar, and engaging said shoe, for adjusting the same relative to said cutter, and a knife fixed to the lower edge of said shoe.

4. In a mower of the character described, the combination of a carriage comprising side frame members, a rotary cutter extending transversely of said side frame members, a cross bar mounted adjacent the path of said cutter blades, a shoe mounted upon said cross bar, and secured against horizontal movement, a plurality of adjusting screws journalled in said cross bar and anchored in said shoe, and adapted for vertical adjustment of said shoe, and a knife mounted on said shoe and cooperating with said cutter blades.

5. In a mower of the character described, the combination of a rotary cutter, means for rotating said cutter, a cross frame member extending between said side frame members and parallel to said cutter, a knife supporting shoe secured to said cross bar against horizontal displacement and adjusting screws mounted at the ends and intermediate the ends of said shoe for effecting the vertical adjustment of said shoe.

6. In a mower of the character described, the combination of side frame members, a rotary cutter comprising a shaft journalled in said side frame members, and blades fixed to said shaft, a cross bar fixed at it ends to said frame members, a shoe extending along said cross bar, and carrying a knife cooperating with said blades, and adjusting screws located at points intermediate the ends of said cross bar and shoe, and operative to adjust said shoe vertically with respect to the path of said cutter blades.

In witness whereof, I hereunto subscribe my name this 12th day of April, A. D. 1922.

JOSEPH A. ROSEMAN.